United States Patent [19]

James

[11] 4,038,118

[45] July 26, 1977

[54] THREE DIMENSIONAL COMPOSITE STRUCTURE AND METHOD FOR INCORPORATING FITTINGS

[75] Inventor: Varnell L. James, Enumclaw, Wash.

[73] Assignee: The Boeing Company, Seattle, Wash.

[21] Appl. No.: 663,876

[22] Filed: Mar. 4, 1976

Related U.S. Application Data

[62] Division of Ser. No. 479,397, June 14, 1974, Pat. No. 3,978,256.

[51] Int. Cl.² .............................................. B31C 13/00
[52] U.S. Cl. .................................... 156/143; 156/182; 156/192; 156/195; 244/132; 428/36; 428/310
[58] Field of Search .................... 428/66, 36, 185, 187, 428/99, 188, 143, 310; 244/132, 117 A; 60/200 A; 156/143, 182, 192, 195

[56] References Cited

U.S. PATENT DOCUMENTS

| 2,954,828 | 10/1960 | Marchetti | 156/185 |
| 3,014,353 | 12/1961 | Scully et al. | 60/200 A |
| 3,466,219 | 9/1969 | Schwartz | 60/200 A |

*Primary Examiner*—Edward G. Whitby
*Attorney, Agent, or Firm*—Morris A. Case; Bernard A. Donahue

[57] ABSTRACT

A three-dimensional composite structure with integral reinforcing ribs. The ribs have a core to include spaced metal inserts that are positioned to accept load bearing fasteners. A lightweight reinforcing material fills the remainder of the core. An adhesive tape with continuous filament composite fibers encircle the rib. The ribs are positioned between an inner and outer shell of structurally reinforced plastic and wound circumferentially and laterally with continuous filament composite tape.

7 Claims, 17 Drawing Figures

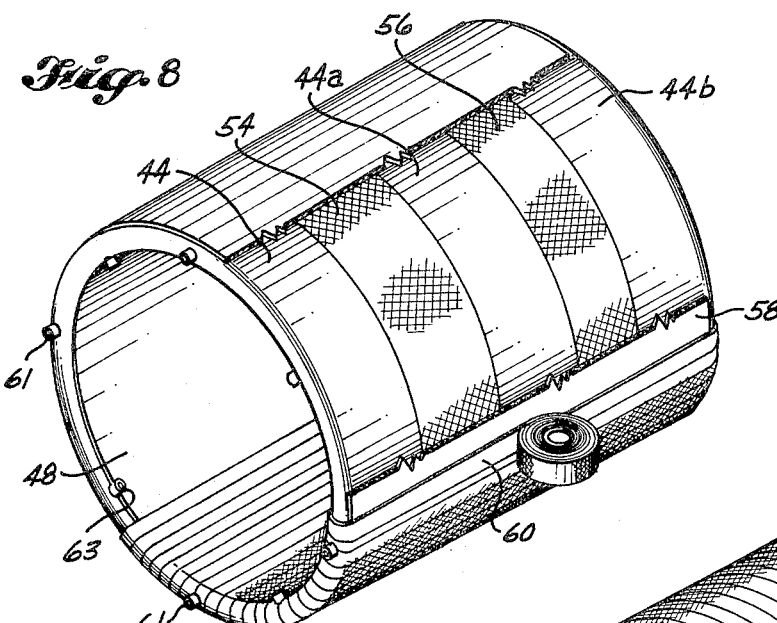
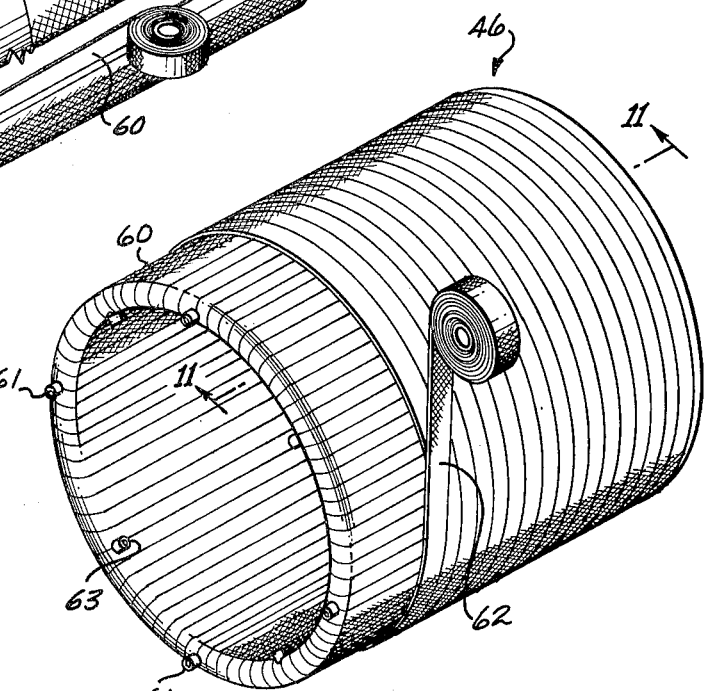
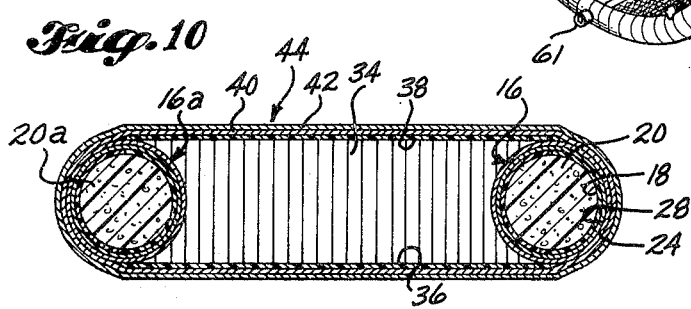
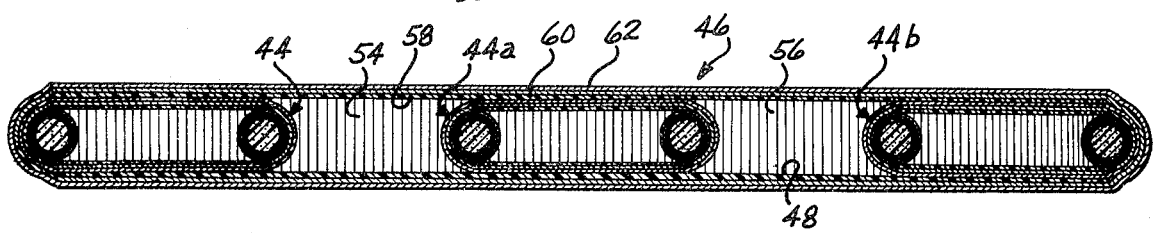

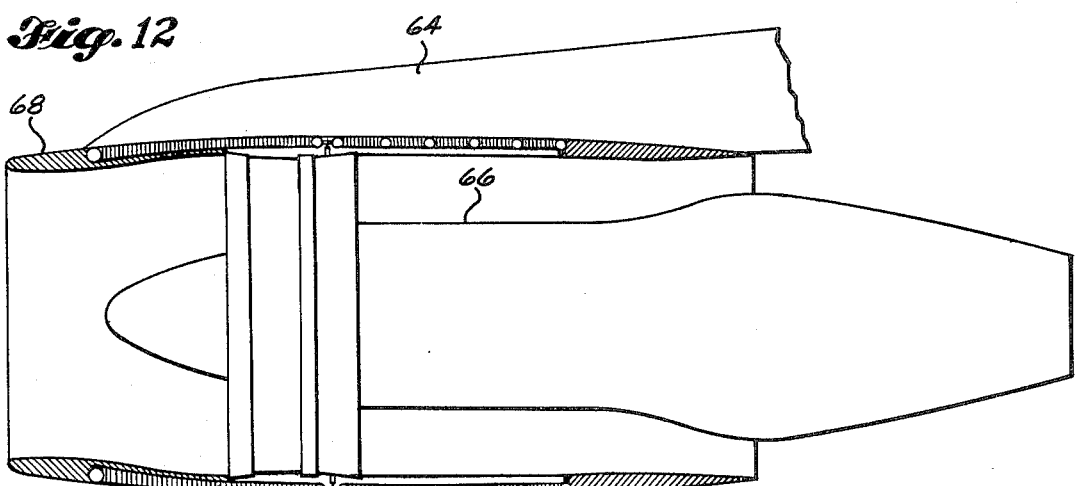
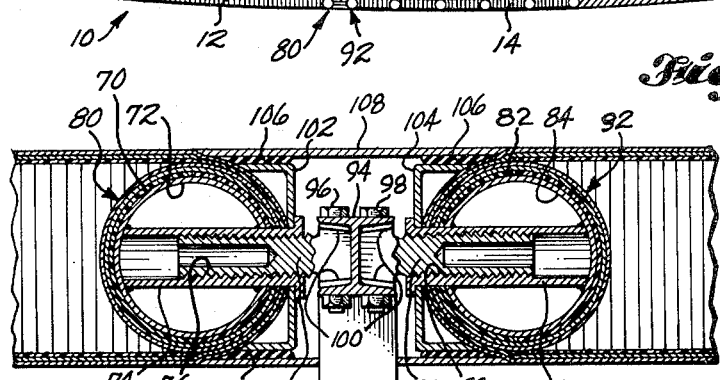
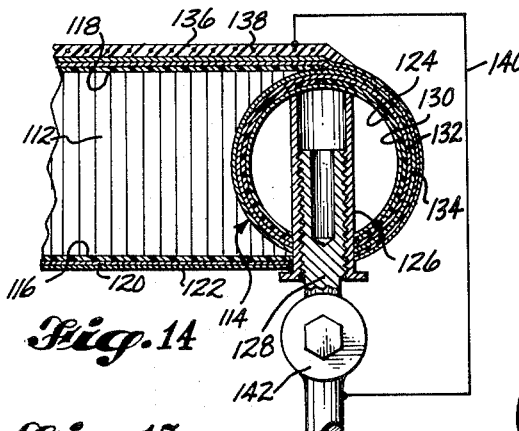
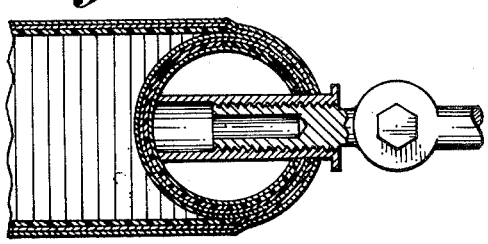
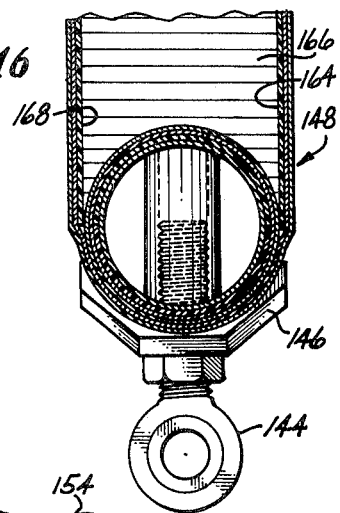
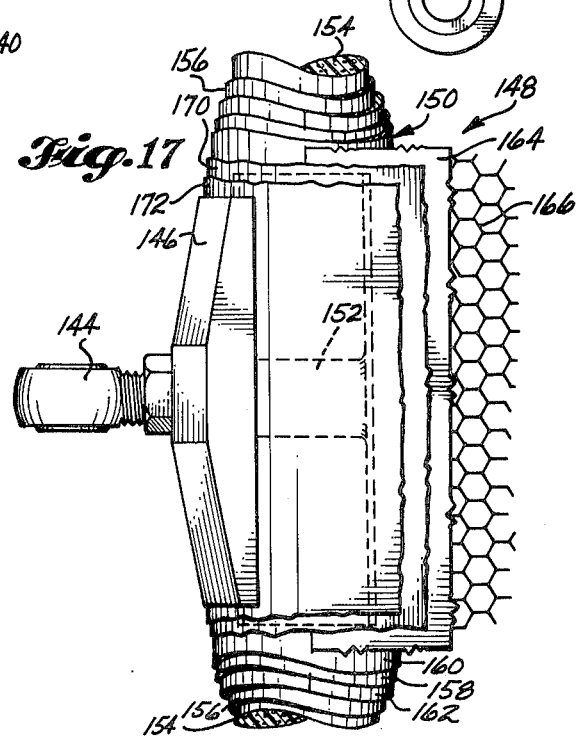

THREE DIMENSIONAL COMPOSITE STRUCTURE AND METHOD FOR INCORPORATING FITTINGS

This is a division, of application Ser. No. 479,397, filed June 14, 1974 now U.S. Pat. No. 3,978,256.

BACKGROUND OF THE INVENTION

Normally, composite covered monocoque surfaces are laid up with cloth or tape type composites and are terminated at the edges. Structures have been made with continuous filament winding on the outside surface bfut monocoque structures have not been made with continuous filament winding covering the inside and outside surfaces. When mechanical fasteners are inserted in these structures the loads are carried by the matrix and bond line in shear.

SUMMARY OF THE INVENTION

Metal inserts for structural load attach points are encased within structural reinforced plastics which in turn is completely and continuously encased within continuous filaments composite tapes to place the fibers in tension or compression instead of being in shear.

A pair of half-section annular ring shells are prepared from reinforced plastics. The two sections are brought together to surround a core and bonded together with a plastic adhesive to form a structural rib. The core includes a series of tubular metal inserts arranged within the shell with a lightweight reinforcing material therebetween. The metal inserts are arranged to accept a fastener from either a side, a radial direction, or both a side and a radial direction. A continuous filament composite tape is wound around the cross section of the rib until it completely encircles same. Ribs are placed side by side with a lightweight structural reinforcing material such as honeycomb or foamed plastic between the ribs and a reinforced plastic shell located above and below. This structure is then encased with continuously wound longitudinally extending composite tape encircling the inside and outside surfaces; as well as winding circumferentially around both the inside and the outside surface to form a unitized structure. Unitized structures are quickly joined to each other or to other structures by the use of fasteners joined to the metal inserts in the ribs.

It is an object of this invention to provide a three-dimensional composite structure that will transfer loads into the structure to place the composite fibers in tension or compression.

It is another object of this invention to provide an open-ended monocoque structure that may be readily joined to another such structure or to a load bearing point.

DESCRIPTION OF THE DRAWINGS

FIG. 8 shows the structure of FIG. 7 assembled and being wrapped with composite tape to form a unitized structure.

FIG. 9 shows a perspective view of the structure of FIG. 8 being wrapped circumferentially with composite tape.

FIG. 10 shows a section from FIG. 6 taken along lines 10—10.

FIG. 11 shows a sectional view taken along lines 11—11 of FIG. 9.

FIG. 12 shows a side elevational sectional view of an airplane cowling using an assembled three-dimensional composite structure.

FIG. 13 shows an enlarged fragmented sectional view of the joint between structures of FIG. 12.

FIG. 14 shows a fragmented sectional view of a radially extending fastener.

FIG. 15 shows a fragmented sectional view of a fastener extending endwise.

FIG. 16 shows a fragmented sectional view of an alternate embodiment for a fastener.

FIG. 17 shows a fragmented side view of the fastener of FIG. 16.

DETAILED DESCRIPTION

An engine cowling 10 as shown in FIG. 12 is an assembly of an inlet portion 12 and a structural portion 14. This cowling is representative of a three-dimensional monocoque open-ended annulus section, and is not intended the invention be limited to a cowling.

Figure 1:
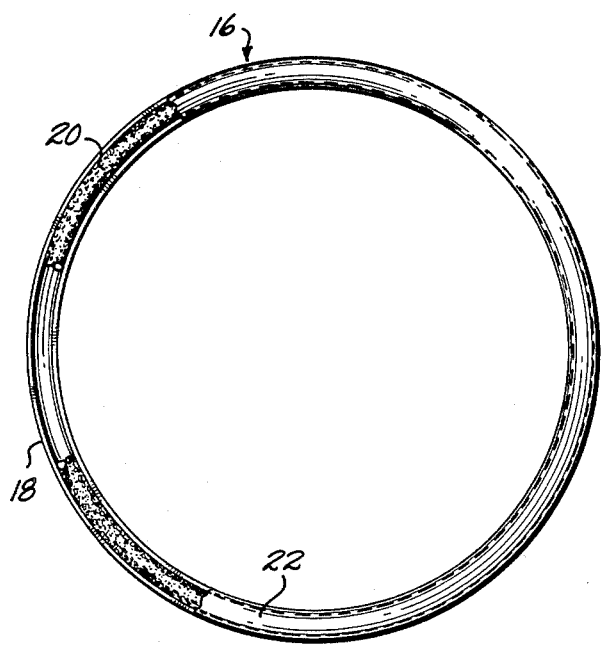
FIG. 1 shows a side view partially cut away showing a rib as disclosed by this invention.
Figure 2:
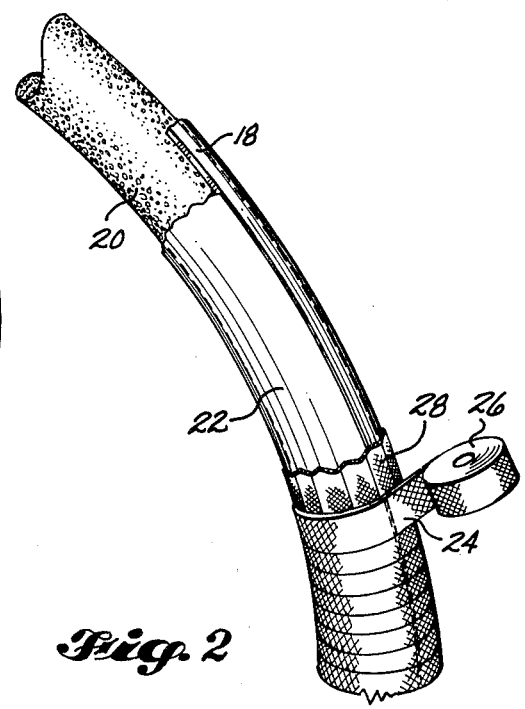
FIG. 2 is a fragmented perspective view of the rib of FIG. 1 showing the rib being wound with composite tape.

The three-dimensional structure incorporates a reinforcement or rib as best shown in FIGS. 1 through 4. In FIG. 1 the rib 16 has a glass reinforced plastic half-section annular ring 18. This is a complete ring frame with a half cross section. A core material 20 is coated with an adhesive resin or plastic such as an epoxy and is placed in the half-section which was earlier coated with an adhesive. This core material may be any lightweight reinforcing material such as honeycomb, foamed plastic as here shown or egg crate spacers. A mating glass reinforced plastic ring 22 in a half-section is coated with an adhesive and placed on the core then cured to form the rib. Preferably, the half-section rings overlay each other. The formed rib preferably is circular in cross section, however, it may also be square, rectangular, oblong or annular. The formed rib is covered with a composite tape 24 spirally wound and extending essentially normal to the circumference. The tape has continuous filament composite fibers such as graphite running lengthwise along the tape. Composite fibers other than graphite may be used as long as the fibers may be wrapped on a relatively short radius without breaking. The tape has an adhesive plastic on one side 26 to permit bonding. This adhesive may vary according to the composite fibers being used. The tape is wrapped around the cross section until the full surface has been covered, then the resin is cured. In FIG. 2, another layer 28 of circumferentially wound composite tape is used.

Figure 3:
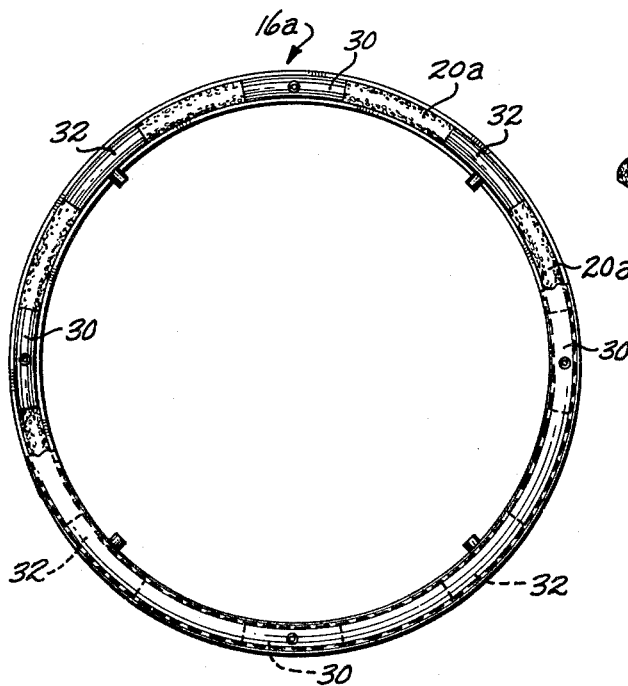
FIG. 3 is an end view partially cut away of a rib showing metal inserts in the core.
Figure 4:
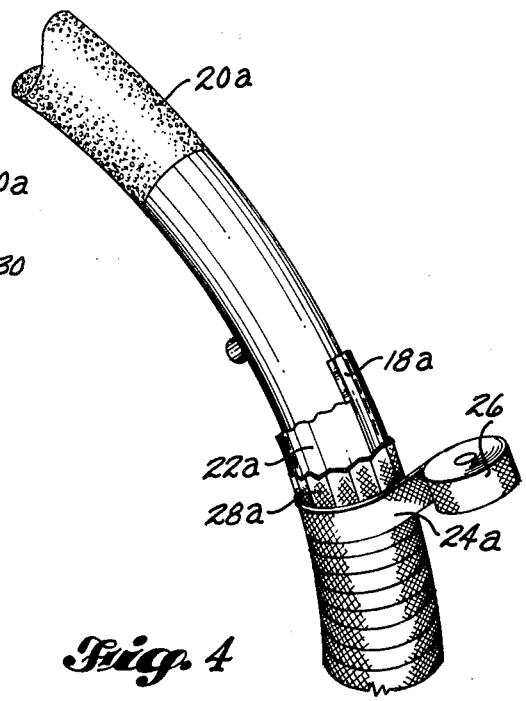
FIG. 4 is a fragmented perspective view showing a section of the rib of FIG. 3.

In FIGS. 3 and 4, rib 16a has tubular shaped metal inserts 30 which extend laterally or toward a side, and tubular shaped metal inserts 32 which extend radially. In this embodiment inserts 32 all extend radially inward but may extend radially outward as well. The inserts and a structural reinforcement material 20a, which in this embodiment is foamed plastic, spaced between the inserts, make up a core inside a hollow shell of glass reinforced plastic annular half-section rings 18a and 22a. The metal inserts are extended to accept a fastener for joining the rib to load points in other structures. The rib 16a with reinforcements will be spirally wound with a composite tape 24a of continuous filament composite fibers imbedded in an adhesive plastic, and may be would with circumferentially extending tape 28a.

Figure 6:
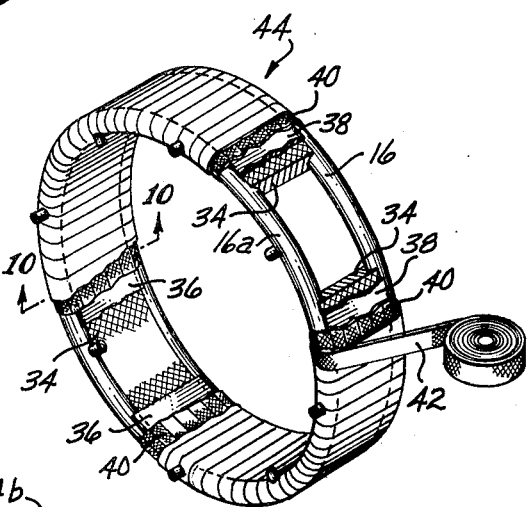
FIG. 6 shows a cutaway perspective view showing taping of an elongated stuctural member as practiced by this invention.

In FIG. 6, a pair of ribs 16 and 16a are spaced apart with a reinforcing material 34 such as foamed plastic or honeycomb and in this embodiment honeycomb is used. The ribs with spacer are placed over a ring shaped shell 36 of glass reinforced plastic. Another glass reinforced plastic shell 38 is placed around the periphery and a continuous filament composite tape 40 continuously wound in peripherally completely around the ribs with spacer. Then another layer of composite tape 42 is wound continuously inside and outside normal to the periphery to form an enlarged annular reinforcing structural member 44.

Figure 5:
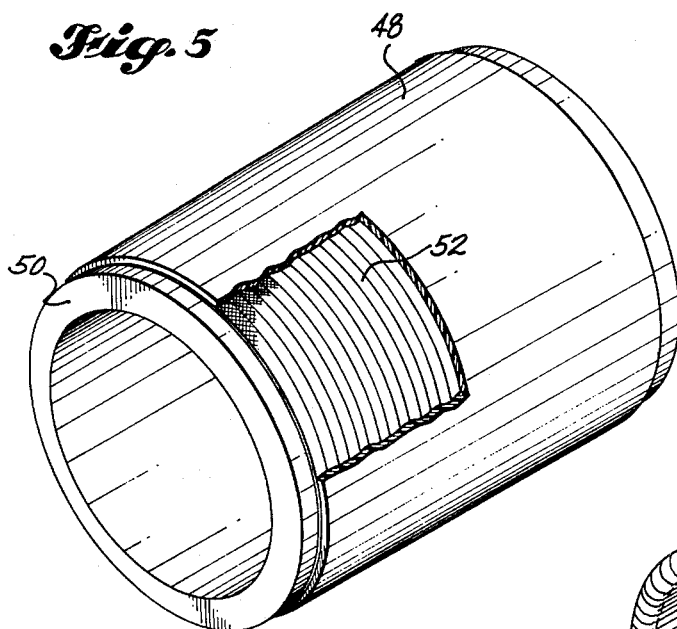
FIG. 5 shows a perspective view partially in section of a structural shell being formed on a mandrel.
Figure 7:
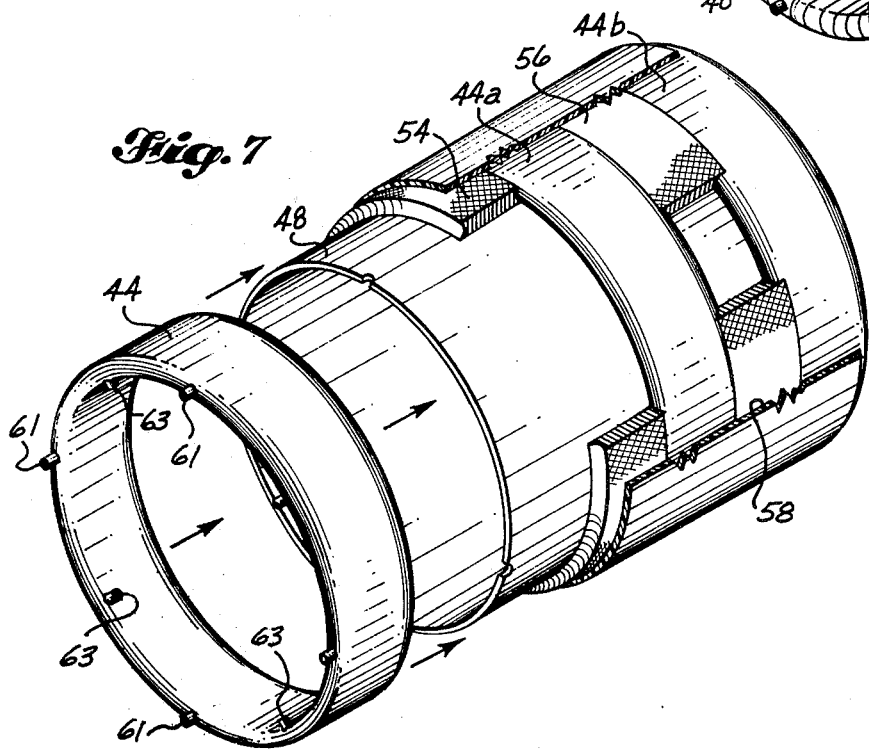
FIG. 7 shows an exploded perspective view partially in section of a structure incorporating three elongated structural members.

The elongated structural member may be further incorporated into a three-dimensional open-ended composite structure 46 as shown in FIG. 9. This unitized structure is built in steps starting with FIG. 5 where a glass reinforced plastic shell 48 is built up on a collapsable mandrel 50. The shell may be laid up directly on the mandrel then cured or a circumferentially wound continuous composite tape 52 may be first laid up on the mandrel and cured simultaneously with the fiberglass shell. In FIG. 7, elongated reinforcing members 44, 44a and 44b are slid onto shell 48 with honeycomb reinforcing members 54 and 56 spaced between and a glass reinforced plastic shell 58 built up to cover the outside periphery. A composite tape 60, as best shown in FIGS. 8 and 9, is wound continuously longitudinaly around the inside and outside surfaces to cover the member, and then a circumferentially extending composite tape 62 is wound inside and out to form the unitized structure 46. The tape may be either cut out or may simply deviate to go around the openings 61 and 63 to metal inserts 30 and 32 respectively.

The unitized structural member lends itself to a buildup of two or more members attached end to end or to an attached structural component from a radial direction. In FIG. 12, annulus shaped open-ended cowling 10 was made up of inlet section 12 and structural member 14 which were joined together and also joined to an airplane strut 64, a turbo jet engine 66, and a variable inlet 68. In FIG. 13, tubular metal insert 70 has circular wall 72 and an outwardly extending receptacle 74 which is threaded at 76 to accept threaded bolt 78. The insert is inside of and forms part of the core of rib 80. Tubular metal insert 82 has circular wall 84 and an outwardly extending receptacle 86 which is threaded at 88 to accept threaded bolt 90. The insert is inside of and forms part of the core of rib 92. The bolts 78 and 90 are joined to wide flange member 94 respectively by bolts 96 and 98. Gaskets 100 are of resilient material and allow for radial expansion and contraction. A pair of annular channels 102 and 104 are made of glass reinforced plastics and use resilient gasket material 106 between the channels and cover plate 108. The member 94 has an integral arm 110 extending radially for attachment to turbo jet engine 66.

In FIG. 14, structural filler material 112 of honeycomb and rib 114 are covered with inside shell 116 and outside shell 118, with continuously wound circumferentially extending composite tape 120 and continuously wound laterally extending composite tape 122 encircling inside and outside. The section of the core of the rib has metal tubular section 124 and radially extending receptacle 126 for accepting load bearing fastener 128. The insert is covered with glass reinforced plastic cover 130, with circumferentially wound continuous composite tape 132 and laterally wound continuous composite tape 134. A layer 136 of resin covers the outside of the structure and has a metal wire mesh 138 imbedded in the resin. A schematic of a bus bar 140 extends to fastener 142 which is joined to structure not shown. The mesh acts as a lightning strike material to prevent its being conducted by the composite material.

In FIGS. 16 and 17, fastener 144 has a partial sleeve 146 to transmit a compressive load into an open-ended three-dimensional monocoque composite structure 148 as practiced by this invention. That structure shows a rib 150 with metal insert 152 for accepting the fastener, foamed plastic core reinforcement 154, glass reinforced plastic ring 156 which is covered with three layers of continuous spirally wound composite tape with layer 158 wound circumferentially and layers 160 and 162 wound essentially normal to the circumference. Several layers of composite tape may be used and the order of placing the layers may be varied. A shell 164 of glass reinforced plastic encircles the rib and covers a metal honeycomb core reinforcement 166. A second shell 168 encircles the rib and honeycomb reinforcement from the other side and layers of composite tape continuously encircle the open-ended structure. In this embodiment layer 170 extends circumferentially and layer 172 extends normal to layer 170. Several layers of continuously wound composite tape may be used, the order of lay up may be varied and layers may extend at other angles to take load as desired.

This disclosure has shown specific embodiments for this invention but is not intended to be limiting. It is readily apparent that numerous variations may be practiced by one skilled in the art without departing from the invention as claimed.

I claim:

1. A method of preparing an open-ended three-dimensional monocoque structure, the steps comprising: forming reinforced plastic annular rings having a core of a series of spaced apart tubular metal inserts and contiguous light weight reinforcing material filling a remainder of the core, wrapping the annular rings with a continuous wind of composite tape, forming a reinforced plastic annular shell, placing the annular rings over the shell with reinforcing filler between, laying up an outside layer of reinforced plastic to form an assembly, wrapping the assembly in the longitudinal direction with continuous filament composite tape.

2. A method of preparing an open-ended three-dimensional monocoque structure as in claim 1, the steps further comprising: attaching the monocoque structure to load points with radially extending fasteners connecting to the metal inserts within the annular rings.

3. A method of preparing an open-ended three-dimensional monocoque structure as in claim 1, the steps further comprising: joining at least two assemblies at the ends with fasteners extending into the metal inserts of the annular rings, and attaching the monocoque structure to load points with radially extending fasteners connecting to the metal inserts.

4. A method of preparing an annular shaped reinforcing rib, the steps comprising: forming a pair of half-section annular rings of glass reinforced plastic, placing within the half-sections a core material of a series of spaced apart tubular metal inserts to receive fasteners and a light weight reinforcing material contiguous to and filling the space between inserts with the light weight reinforcing material consisting essentially of honeycomb, foamed plastics or egg crate spacers, coating the core and half sections with an adhesive resin and curing, wrapping the cured rib with a continuous filament composite tape first circumferentially and then around the cross section, curing to set up the resin in the tape.

5. A method of preparing an annular shaped reinforcing rib as in claim 4 further comprising using graphite filaments as the composite.

6. A method of fabricating an open-ended monocoque structure, the steps comprising: forming an inside shell of glass reinforced plastic, placing a pair of annular reinforcing ribs having a core of a series of spaced apart tubular metal inserts for accepting a fastener and a light weight reinforcing material between the inserts over the shell, filling the space between ribs with material consisting essentially of honeycomb or foamed plastic, coating all parts with an adhesive resin, laying up glass reinforced plastic around the outside, curing to form a unitized structure, wrapping continuous filament graphite tape longitudinally around the inside and outside surface of the structure to cover all surfaces, wrapping continuous filament graphite tape circumferentially around the inside and outside surfaces of the structure, curing to set up the resin to form an elongate annular reinforcing structural member, forming a glass reinforced plastic shell, placing at least two elongate reinforcing members over the shell with a contiguous honeycomb core between, building up a glass reinforced plastic shell over the elongate members and honeycomb, wrapping continuous filament graphite tape longitudinally around the inside and outside surface of the joined members, wrapping continuous filament graphite tape circumferentially inside and out, and curing to set up the resin and form on open-ended monocoque composite structure 7. A method of fabricating an open-ended monocoque structure as in claim 6, the further steps of: joining ends of unitized structures with fasteners entering the metal inserts within the ribs, and fastening the unitized structures to load points with radially extending fasteners that join in the metal inserts in the ribs.

* * * * *